United States Patent
Oh et al.

(10) Patent No.: US 9,012,088 B2
(45) Date of Patent: Apr. 21, 2015

(54) ANODE COMPOSITION COMPRISING ACRYLONITRILE-ACRYLIC ACID COPOLYMER AS BINDER, METHOD FOR PREPARING THE ANODE COMPOSITION AND LITHIUM SECONDARY BATTERY USING THE ANODE COMPOSITION

(75) Inventors: Eun Suok Oh, Daejeon (KR); Young Min Kim, Daejeon (KR); Ok Sun Kim, Daejeon (KR); Min Ah Kang, Daejeon (KR)

(73) Assignee: LG Chem, Ltd. (KR)

( * ) Notice: Subject to any disclaimer, the term of this patent is extended or adjusted under 35 U.S.C. 154(b) by 182 days.

(21) Appl. No.: 12/918,864

(22) PCT Filed: Aug. 7, 2008

(86) PCT No.: PCT/KR2008/004596
§ 371 (c)(1),
(2), (4) Date: Aug. 23, 2010

(87) PCT Pub. No.: WO2009/128589
PCT Pub. Date: Oct. 22, 2009

(65) Prior Publication Data
US 2011/0003207 A1  Jan. 6, 2011

(30) Foreign Application Priority Data

Apr. 16, 2008 (KR) .................. 10-2008-0035012

(51) Int. Cl.
| | | |
|---|---|---|
| *H01M 4/02* | (2006.01) | |
| *H01M 4/134* | (2010.01) | |
| *H01M 4/04* | (2006.01) | |
| *H01M 4/133* | (2010.01) | |
| *H01M 4/136* | (2010.01) | |
| *H01M 4/1393* | (2010.01) | |
| *H01M 4/1395* | (2010.01) | |
| *H01M 4/1397* | (2010.01) | |
| *H01M 4/62* | (2006.01) | |
| *H01M 4/66* | (2006.01) | |
| *H01M 10/052* | (2010.01) | |

(52) U.S. Cl.
CPC ............ *H01M 4/134* (2013.01); *H01M 4/0404* (2013.01); *H01M 4/133* (2013.01); *H01M 4/136* (2013.01); *H01M 4/1393* (2013.01); *H01M 4/1395* (2013.01); *H01M 4/1397* (2013.01); *H01M 4/621* (2013.01); *H01M 4/622* (2013.01); *H01M 4/624* (2013.01); *H01M 4/625* (2013.01); *H01M 4/626* (2013.01); *H01M 4/661* (2013.01); *H01M 10/052* (2013.01); *H01M 2004/021* (2013.01); *H01M 2004/027* (2013.01); *Y02E 60/122* (2013.01)

(58) Field of Classification Search
CPC ..................... H01M 10/052; H01M 2004/021; H01M 2004/027; H01M 4/0404; H01M 4/133; H01M 4/134; H01M 4/136; H01M 4/1393; H01M 4/1395; H01M 4/1397; H01M 4/621; H01M 4/622; H01M 4/624; H01M 4/625; H01M 4/626; H01M 4/661
USPC .......... 429/209, 231.8, 231.95; 252/500, 511, 252/512, 519.33; 427/126
See application file for complete search history.

(56) References Cited

U.S. PATENT DOCUMENTS

| | | | |
|---|---|---|---|
| 7,297,444 B2 * | 11/2007 | Sano .............................. | 429/217 |
| 7,695,870 B2 | 4/2010 | Park et al. | |
| 7,700,234 B2 * | 4/2010 | Nakayama et al. ........... | 429/217 |
| 2001/0036577 A1 | 11/2001 | Nakane et al. | |
| 2003/0073000 A1 | 4/2003 | Lee et al. | |
| 2006/0263688 A1 | 11/2006 | Guyomard et al. | |
| 2008/0003506 A1 | 1/2008 | Suzuki et al. | |
| 2010/0009258 A1 | 1/2010 | Hasegawa et al. | |
| 2011/0086268 A1 * | 4/2011 | Le ................................ | 429/217 |

FOREIGN PATENT DOCUMENTS

| | | |
|---|---|---|
| CN | 1412870 A | 4/2003 |
| CN | 101023543 A | 8/2007 |
| CN | 101103475 A | 1/2008 |
| JP | 08-287915 A | 11/1996 |
| JP | 2001307728 A | 11/2001 |
| JP | 2002-056896 A | 2/2002 |

(Continued)

OTHER PUBLICATIONS

International Search Report, PCT/KR2008/004596, dated Sep. 29, 2008.
Chinese Office Action for Application No. 200880125507.2 dated May 24, 2012.

*Primary Examiner* — Milton I Cano
*Assistant Examiner* — Ling R Zeng
(74) *Attorney, Agent, or Firm* — Lerner, David, Littenberg, Krumholz & Mentlik, LLP

(57) ABSTRACT

An anode composition for a lithium secondary battery is provided. The anode composition comprises an anode active material, a conductive material, and an acrylonitrile-acrylic acid copolymer with a high molecular weight as a binder. The acrylonitrile-acrylic acid copolymer has a molar ratio of acrylonitrile to acrylic acid of 1:0.01-2. Further provided are a method for preparing the anode composition and a lithium secondary battery using the anode composition. The binder has improved resistance to an electrolyte solution due to its enhanced adhesive strength. In addition, the use of the anode composition prevents the active material layer from being peeled off or separated from a current collector during charge and discharge to achieve improved capacity and cycle life characteristics of the battery.

7 Claims, No Drawings

(56) References Cited

FOREIGN PATENT DOCUMENTS

| | | |
|---|---|---|
| JP | 2003-132893 A | 5/2003 |
| JP | 2004-185826 A | 7/2004 |
| JP | 2007299738 A | 11/2007 |
| JP | 2010518581 A | 5/2010 |
| KR | 20000044901 A | 7/2000 |
| KR | 20020011563 A | 2/2002 |
| KR | 20060024390 A | 3/2006 |
| KR | 20060119797 A | 11/2006 |
| KR | 20070005341 A | 1/2007 |
| KR | 20070041785 A | 4/2007 |
| KR | 100754746 B1 | 9/2007 |
| KR | 20070106974 A | 11/2007 |
| KR | 20080008138 A | 1/2008 |
| KR | 20080034219 A | 4/2008 |
| KR | 19980042815 | 8/2008 |
| WO | 2008097723 A1 | 8/2008 |

\* cited by examiner

US 9,012,088 B2

ANODE COMPOSITION COMPRISING ACRYLONITRILE-ACRYLIC ACID COPOLYMER AS BINDER, METHOD FOR PREPARING THE ANODE COMPOSITION AND LITHIUM SECONDARY BATTERY USING THE ANODE COMPOSITION

CROSS REFERENCE TO RELATED APPLICATIONS

The present application is a national phase entry under 35 U.S.C. §371 of International Application No. PCT/KR2008/004596, filed Aug. 7, 2008, published in English, which claims priority from Korean Patent Application No. 10-2008-0035012, filed Apr. 16, 2008. The disclosures of said applications are incorporated by reference herein.

TECHNICAL FIELD

The present invention relates to an anode composition comprising an acrylonitrile-acrylic acid copolymer with a high molecular weight as a binder, a method for preparing the anode composition, and a lithium secondary battery using the anode composition. The binder has improved resistance to an electrolyte solution due to its enhanced adhesive strength. In addition, the use of the anode composition prevents the active material layer from being peeled off or separated from a current collector during charge and discharge to achieve improved capacity and cycle life characteristics of the battery.

BACKGROUND ART

With recent technological advances and increasing demand for mobile devices, there has been dramatically increased demand for secondary batteries as energy sources. Particularly, lithium secondary batteries are widely used at present for their high energy density and high voltage. A typical lithium secondary battery uses a lithium transition metal oxide as a cathode active material and lithium, a carbon-based material, a silicon-based material or a tin-based material as an anode active material.

Lithium has attracted the most attention as an anode for secondary batteries due to its low potential and high electrical capacity per unit weight. In actuality, lithium has been most widely used as an anode material for primary batteries for the past three decades.

However, lithium suffers from the disadvantages of unsafety and poor cycle characteristics due to dendrite growth during repeated charge/discharge cycles, thus being unsuitable for use in secondary batteries. Although extensive research has been conducted on the use of lithium in the fabrication of secondary batteries, many problems still remain unsolved.

Since Sony Energy Tech. (Japan) reported a hard carbon-based anode active material for a lithium secondary battery capable of replacing lithium in the early 1990's, many carbon-based anode active materials have been put to practical use. Batteries with a capacity above 350 mAh/g, which is close to the theoretical value, are realized at present.

Charge/discharge cycles in a carbon-based electrode proceeds through processes different from those of lithium in which electrodeposition and dissolution of lithium ions are repeated. That is, lithium ions are repetitively inserted into and removed from a carbon electrode. This procedure is commonly termed 'intercalation/deintercalation'. The electrochemical reactions are affected by various factors, including the degree of crystallization, shape and crystal growth direction of carbon. Some carbon allotropes are known. Of these, graphite and hard carbon having an irregular arrangement structure are particularly suitable for practical use in lithium ion batteries.

However, an anode made of a carbon-based material has a theoretical maximum capacity of 372 mAh/g (844 mAh/cc) and thus has a limitation in capacity increase. This limitation makes it impossible for the anode to perform a sufficient role as an energy source of next-generation mobile devices that are rapidly being developed. Annealing of soft carbon at a temperature of 1,000° C. or less is advantageous in terms of high capacity (500-1,000 mAh/g), but the irreversible portion of the capacity is significantly large. Therefore, graphite having a large reversible capacity is generally used.

Silicon-based anode active materials are known to reversibly absorb and desorb a large amount of lithium through reactions between silicon or a cobalt, nickel or iron alloy of silicon and lithium to form compounds. In this connection, further investigations are currently in progress. A silicon-based anode active material has a theoretical maximum capacity of about 4,200 mAh/g, which is ten times greater than that of carbon-based materials. Therefore, a silicon-based anode active material is a promising material capable of replacing carbon-based materials due to its high capacity.

On the other hand, the theoretical electrical capacity of a tin-based anode active material is 990 mAg/g, which is 2.7 times greater than that of graphite electrodes. A tin-based anode active material is also currently in the spotlight as an anode active material capable of replacing graphite electrodes.

However, when silicon- and tin-based anode active materials react with lithium during charge and discharge, they undergo a significant increase in volume ranging from 200 to 300%. Due to this volume change, the anode active materials are separated from current collectors or the anode active material particles are broken into smaller pieces during continued charge and discharge, causing a loss in electrical contact. Further, the irreversible discharge capacity close to 50% of the initial capacity results in a marked reduction in capacity as the charge/discharge cycles proceed, leading to poor cycle life characteristics.

A typical anode composition for a lithium secondary battery comprises an anode active material, a binder and a conductive material. In this connection, Korean Patent Application No. 10-2000-0044901 A, which was filed on Aug. 2, 2000, enumerates various kinds of polymers, including polyacrylonitrile and polyvinylidene fluoride, for use in a lithium-sulfur battery undergoing rapid electrochemical reactions, and discloses selected combinations of the polymers as binders (see Examples Section). Korean Patent Application No. 10-1997-0063299 A, which was filed on Nov. 27, 1997, discloses a binder binding with an active material to produce an anode sheet of a lithium secondary battery (see page 7, lines 24-26).

As the charge/discharge cycles proceed, the volume of an anode active material is generally varied. This volume variation leads to a degradation in the performance (e.g., shortened cycle life) of a battery using the anode active material. The kind and the amount of a binder in an anode composition affect a change in the volume of an anode active material accompanied by charge/discharge cycles. Generally, a change in the volume of an active material tends to decrease in proportion to the amount of a binder.

The use of a binder in an excessively large amount for the purpose of reducing a change in the volume of an active material during charge and discharge can somewhat prevent the separation of the active material from a current collector, as mentioned above, but involves many problems, for example, an increase in the electrical resistance of an anode due to the electrical insulating properties of the binder and a decrease in the capacity of a battery due to the relatively small amount of the active material.

Thus, there is an urgent need to develop a binder that exhibits high adhesive strength and excellent mechanical characteristics to sufficiently withstand a large change in the volume of a silicon- or tin-based anode active material in a lithium secondary battery despite the use of a small amount of the binder.

DISCLOSURE OF INVENTION

Technical Problem

The present inventors have earnestly and intensively conducted research to solve the above problems. As a result, the present inventors have found that the use of a particular acrylonitrile-acrylic acid copolymer as a binder in the preparation of an anode composition for a lithium secondary battery resulted in enhanced adhesive strength and improved electrolyte solution resistance of the anode composition.

Thus, it is an object of the present invention to provide an anode composition for a lithium secondary battery which comprises the particular acrylonitrile-acrylic acid copolymer to prevent an active material layer from being peeled off or separated from a current collector during charge and discharge, inhibit a reduction in capacity retention accompanied by the charge/discharge cycles and prolong the life of the battery.

Technical Solution

In accordance with an aspect of the present invention, there is provided an anode composition for a lithium secondary battery comprising an anode active material, a binder and a conductive material wherein the binder is an acrylonitrile-acrylic acid copolymer having a molar ratio of acrylonitrile to acrylic acid of 1:0.01-2.

The acrylonitrile-acrylic acid copolymer preferably has a molecular weight in the range of 100,000 to 5,000,000.

The binder is preferably present in an amount of 1 to 30% by weight, based on the total weight of the anode composition.

The anode active material is preferably selected from the group consisting of: carbon and graphite materials; metals capable of forming alloys with lithium, and compounds containing the metals; composites of a metal or metal compound and a carbon or graphite material; and lithium nitrides.

The conductive material is preferably graphite, carbon black a conductive fiber, a metal powder, a conductive whisker, a conductive metal oxide or a conductive polymer.

The conductive material is preferably present in an amount of 1 to 50% by weight, based on the total weight of the anode composition.

The anode composition further comprises a filler.

In accordance with another aspect of the present invention, there is provided a method for producing an anode of a lithium secondary battery, the method comprising: dissolving an acrylonitrile-acrylic acid copolymer with a high molecular weight as a binder in a solvent wherein the molar ratio of acrylonitrile to acrylic acid in the copolymer is 1:0.01-2; adding a mixture of an anode active material and a conductive material to the solution to prepare an anode composition wherein the anode active material is selected from the group consisting of carbon and graphite materials, metals capable of forming alloys with lithium, compounds containing the metals, composites of a metal or metal compound and a carbon or graphite material, and lithium nitrides; applying the anode composition to a current collector; and drying the composition and the current collector at a temperature of 200° C. or less.

In accordance with another aspect of the present invention, there is provided a lithium secondary battery using the anode composition.

In accordance with yet another aspect of the present invention, there is provided a lithium secondary battery comprising an anode produced by the method.

Advantageous Effects

According to the present invention, the use of the acrylonitrile-acrylic acid copolymer with a high molecular weight as a binder for an anode improves the adhesion of the electrode composition to a current collector and reduces dissolution or swelling of the electrode in an organic electrolyte solution to prevent the active material from being peeled off or separated from the current collector despite repeated charge and discharge. Therefore, a lithium secondary battery comprising an anode produced using the binder can be effectively inhibited from reduction in capacity and output retention.

BEST MODE FOR CARRYING OUT THE INVENTION

The present invention provides an anode composition for a lithium secondary battery comprising an anode active material, a binder and a conductive material wherein the binder is an acrylonitrile-acrylic acid copolymer having a high molecular weight.

The acrylonitrile-acrylic acid copolymer exhibits superior adhesion to the surface of a copper foil as a current collector due to the repeated arrangement of nitrile and carboxyl groups. Therefore, even a small amount of the binder enables the adhesion of the active material to the surface of a current collector and can prevent the active material from being separated from the current collector surface as the charge/discharge cycles proceed, in comparison with conventional binders. Based on these advantages of the binder, the anode composition of the present invention can be used to produce an electrode with superior cycle characteristics.

As the charge/discharge cycles proceed, a conventional acrylonitrile polymer with a low degree of polymerization is partially dissolved in or excessively impregnated with a carbonate electrolyte solution containing a lithium salt. This partial dissolution or impregnation inevitably causes swelling of an electrode and peeling or separation of an active material from a current collector. On the other hand, a conventional acrylonitrile polymer with a high degree of polymerization is advantageous in terms of adhesive strength and can be prevented from dissolution and excessive impregnation with an electrolyte solution. However, the use of the acrylonitrile polymer with a high degree of polymerization cause a battery to have the amount of the electrolyte solution slightly larger than the level in which optimum battery characteristics can be attained, which leads to a reduction in charge/discharge capacity as the charge/discharge cycles proceed. These problems of the conventional binders are solved by the use of the acrylonitrile-acrylic acid copolymer with a high molecular weight. Specifically, the acrylonitrile-acrylic acid copolymer possesses the advantages (i.e. good adhesion between a current collector and an active material) of the conventional polyacrylonitrile with a high degree of polymerization, and the presence of the acrylic acid units in the acrylonitrile-acrylic acid copolymer prevents swelling of an electrode by the impregnation with an organic electrolyte solution, thereby enabling the production of an electrode with high charge/discharge capacity and superior cycle characteristics.

The present invention also provides a method for producing an anode using the anode composition.

According to the method of the present invention, an anode is produced by applying a mixture containing an active material, a binder and a conductive material in a solvent to a current collector, and drying the mixture to remove the solvent.

Examples of suitable anode active materials for use in the method include: carbon and graphite materials, such as natural graphite, artificial graphite, expanded graphite, carbon fibers, non-graphitizing carbon, carbon black carbon nanotubes, fullerenes and activated carbon; metals, such as Al, Si, Sn, Ag, Bi, Mg, Zn, In, Ge, Pb, Pd, Pt and Ti, which are capable of forming alloys with lithium, and compounds containing the metal elements; composites of a metal or metal compound and a carbon or graphite material; and lithium nitrides.

The binder is an acrylonitrile-acrylic acid copolymer with a higher molecular weight. The copolymer can be prepared by polymerization of acrylonitrile ($C_3H_3N$) and acrylic acid ($C_3H_4O_2$) monomers as reactants. Such polymerization processes include, but are not limited to, solution, suspension, precipitation and emulsion polymerization processes. In the present invention, the acrylonitrile-acrylic acid copolymer is prepared by solution polymerization of the monomers at 70° C. under a nitrogen atmosphere. The molar ratio of the acrylonitrile units to the acrylic acid units in the copolymer is preferably adjusted to 1:0.01-2, but is not limited to this range. If the proportion of the acrylic acid units in the copolymer is lower than the lower limit, improvement in the resistance of the copolymer to an organic electrolyte solution cannot be expected. Meanwhile, if the proportion of the acrylic acid units in the copolymer is higher than the upper limit (i.e. the content of the acrylonitrile units in the binder is relatively low), the adhesive strength of the anode tends to deteriorate.

The molecular weight of the acrylonitrile-acrylic acid copolymer is in the range of 100,000 to 5,000,000 and preferably in the range of 200,000 to 3,000,000. The use of the acrylonitrile-acrylic acid copolymer with a molecular weight lower than 100,000 reduces the adhesive strength of the binder and causes dissolution or swelling of the anode in an organic electrolyte solution. As a result, the electrode is liable to be peeled off or separated from the current collector as the charge/discharge cycles proceed, leading to a reduction in the capacity retention of a final battery. Meanwhile, the use of the acrylonitrile-acrylic acid copolymer with a molecular weight higher than 5,000,000 causes an increase in the internal electrical resistance of the anode and an increase in the viscosity of the electrode composition, making it difficult to handle the electrode composition.

The binder may be present in an amount of about 1 to about 30% by weight and preferably 2 to 20% by weight, based on the total weight of the anode composition. If the binder is added in an amount of less than 1% by weight, sufficient binding effects are not expected. Meanwhile, if the binder is added in an amount exceeding 30% by weight, the internal resistance of the anode increases, resulting in deteriorated characteristics of a final battery.

The binder is provided in a solution state. The amount of the binder in the solution may be from 1 to 15% by weight. The binder in a solution state makes the anode composition uniform and serves to control the viscosity of the anode composition so as to facilitate the mixing of the anode composition and the application of the anode composition to the current collector. Examples of preferred solvents used to prepare the binder solution include, but are not limited to, organic solvents, such as dimethyl-sulfoxide (DMSO), N-methyl-2-pyrrolidone (NMP) and ethylene glycol, and distilled water.

The binder of the anode composition according to the present invention may be used as for a cathode active material.

The conductive material is a component that acts to improve the conductivity of the anode active material. Any conductive material may be used so long as it has conductivity without causing chemical changes in a final battery. The conductive material may be added in an amount of 1 to 50% by weight, based on the total weight of the anode composition. Examples of suitable conductive materials for use in the present invention include: graphite materials, such as natural graphite and artificial graphite; carbon black products, such as carbon black, acetylene black, Ketjen black, channel black, furnace black, lamp black and thermal black; conductive fibers, such as carbon fibers and metal fibers; metal powders, such as carbon fluoride, aluminum and nickel powders; conductive whiskers, such as zinc oxide and potassium titanate; conductive metal oxides, such as titanium oxide; and conductive polymers, such as polyphenylene derivatives.

Optionally, the anode composition may further comprise a filler that serves to inhibit swelling of the anode. So long as the filler is a fibrous material that causes no chemical changes in a final battery, there is no particular restriction on the kind of the filler. Examples of suitable fillers for use in the present invention include: olefinic polymers, such as polyethylene and polypropylene; and fibrous materials, such as glass fibers and carbon fibers.

The present invention also provides a secondary battery using the anode composition.

The secondary battery is fabricated by applying the anode composition to a current collector, drying the anode composition, followed by rolling. At this time, it is required to dry the anode composition at a temperature of 200° C. or less and preferably 150° C. or less. The copolymer is rapidly decomposed at a drying temperature higher than 200° C., making it impossible to attain the desired effects.

The anode current collector is made to a thickness of 3 to 500 µm. Any anode current collector that has conductivity without inducing chemical changes in the battery may be used without limitation in the present invention. As the anode current collector, there can be used, for example, copper, stainless steel, aluminum, nickel, titanium, sintered carbon, copper or stainless steel whose surface is treated with carbon, nickel, titanium or silver, an aluminum-cadmium alloy, or the like. As in a cathode current collector, fine irregularities may be formed on the surface of the anode current collector to reinforce the adhesive strength of the anode active material. The anode current collector may have various forms, including films, sheets, foils, nets, porous structures, foamed structures and non-woven fabric structures.

The other constituent elements of the lithium secondary battery will be explained below.

The lithium secondary battery comprises a cathode, a separator and a lithium salt-containing non-aqueous electrolyte other than the anode. The cathode is produced by applying a mixture of a cathode active material, a conductive material and a binder to a cathode current collector, and drying the mixture. If needed, a filler may be further added to the mixture. Suitable cathode active materials include, but are not limited to, layered compounds, such as lithium cobalt oxide (LiCoO$_2$) and lithium nickel oxide (LiNiO$_2$), and compounds substituted with one or more transition metals; lithium manganese oxides, such as compounds represented by Li$_{1+x}$Mn$_{2-x}$O$_4$ (0≤x≤0.33), LiMnO$_3$, LiMn$_2$O$_3$ and LiMnO$_2$; lithium copper oxide (Li$_2$CuO$_2$); vanadium oxides, such as LiV$_3$O$_8$, LiFe$_3$O$_4$, V$_2$O$_5$ and Cu$_2$V$_2$O$_7$; Ni-site type lithiated nickel oxides represented by LiNi$_{1-x}$M$_x$O$_2$ (M=Co, Mn, Al, Cu, Fe, Mg, B or Ga, and 0.01≤x≤0.3); lithium manganese composite oxides represented by LiMn$_{2-x}$M$_x$O$_2$ (M=Co, Ni, Fe, Cr, Zn or Ta, and 0.01≤x≤0.1) and Li$_2$Mn$_3$MO$_8$ (M=Fe, Co, Ni, Cu or Zn); LiMn$_2$O$_4$ in which Li is partially replaced by alkaline earth metal ions; disulfide compounds; and Fe$_2$(MoO$_4$)$_3$.

The cathode current collector is typically made to a thickness of 3 to 500 μm. Any cathode current collector that has conductivity without inducing chemical changes in the battery may be used without limitation in the present invention. As the cathode current collector, there can be used, for example, stainless steel, aluminum, nickel, titanium, sintered carbon, or aluminum or stainless steel whose surface is treated with carbon, nickel, titanium or silver, or the like. Fine irregularities may be formed on the surface of the cathode current collector to reinforce the adhesive strength of the cathode active material. The cathode current collector may have various forms, including films, sheets, foils, nets, porous structures, foamed structures and non-woven fabric structures.

The binder for the cathode active material is a component that assists in binding the active material to the conductive material and adhering the active material to the cathode current collector. The binder is typically added in an amount of 1 to 50% by weight, based on the total weight of the cathode composition. The binder may be the acrylonitrile-acrylic acid copolymer with a high molecular weight, but is not limited thereto. Other suitable examples include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, and other copolymers. The conductive material and the filler are the same as those explained in the anode composition.

The separator is interposed between the cathode and the anode. The separator is an insulating thin film that has high ion permeability and high mechanical strength. The separator typically has a pore diameter of 0.01 to 10 μm and a thickness of 5 to 300 μm. As the separator, there can be used, for example, a sheet or non-woven fabric made of a chemically resistant, hydrophobic material selected from olefinic polymers (e.g., polypropylene), glass fibers and polyethylene. In the case where a solid electrolyte, such as a polymer, is used, it may also act as the separator.

The lithium salt-containing non-aqueous electrolyte is composed of a non-aqueous electrolyte and a lithium salt. As the non-aqueous electrolyte, there can be used, for example, a non-aqueous electrolyte solution, an organic solid electrolyte or an inorganic solid electrolyte.

As the non-aqueous electrolyte solution, there can be used an aprotic organic solvent, such as N-methyl-2-pyrrolidone, propylene carbonate, ethylene carbonate, butylene carbonate, dimethyl carbonate, diethyl carbonate, gamma-butyrolactone, 1,2 dimethoxy ethane, tetrahydroxy Franc, 2-methyltetrahydrofuran, dimethyl-sulfoxide, 1,3-dioxolane, formamide, dimethylformamide, dioxolane, acetonitrile, nitromethane, formic acid, methyl formate, methyl acetate, phosphoric acid triester, trimethoxymethane, a dioxolane derivative, sulfolane, methylsulfolane, 1,3-dimethyl-2-imidazolidinone, a propylene carbonate derivative, a tetrahydrofuran derivative, ether, methyl propionate or ethyl propionate.

As the organic solid electrolyte, there can be used, for example, a polyethylene derivative, a polyethylene oxide derivative, a polypropylene oxide derivative, a phosphoric acid ester polymer, poly agitation lysine, polyester sulfide, polyvinyl alcohol, polyfluorovinylidene, or a polymer containing ionically dissociable groups.

As the inorganic solid electrolyte, there can be used, for example, a nitride, halide or sulfate of lithium, such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH or Li$_3$PO$_4$—Li$_2$S—SiS$_2$.

The lithium salt is readily soluble in the non-aqueous electrolyte, and examples thereof include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lithium lower aliphatic carboxylate, lithium tetraphenyl borate, and imides.

For the purposes of improving the charge/discharge characteristics and flame retardancy of the battery, at least one compound selected from pyridine, triethyl-phosphite, triethanolamine, cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxy ethanol and aluminum trichloride may be added to the non-aqueous electrolyte. If desired, the non-aqueous electrolyte may further contain at least one halogenated solvent selected from carbon tetrachloride and ethylene trifluoride to impart nonflammability to the battery. Also, the non-aqueous electrolyte may further contain carbon dioxide gas to achieve improved high-temperature storage characteristics.

MODE FOR THE INVENTION

Hereinafter, the present invention will be explained in more detail with reference to the following examples. However, these examples are given for the purpose of illustration and are not intended to limit the scope of the present invention.

EXAMPLES

Example 1

47.5 g of NMP was added to 2.5 g of an acrylonitrile-acrylic acid copolymer (Mw=1,120,000, acrylonitrile/acrylic acid=9.4:0.6 (mol/mol)). The mixture was heated to 80° C. with stirring over a period of 10 minutes. The mixture was completely dissolved for 2 hours while maintaining the temperature at 80° C. The solution was cooled to room temperature to give a 5 wt % binder solution. The binder solution was coated to a thickness of 1 mm on a copper foil, and dried at 130° C. for 2 hours to obtain a binder film.

Example 2

A binder film was produced in the same manner as in Example 1 except that 2.5 g of an acrylonitrile-acrylic acid copolymer (Mw=1,030,000, acrylonitrile/acrylic acid=8.3:1.7 (mol/mol)) was used.

Example 3

A binder film was produced in the same manner as in Example 1 except that 2.5 g of an acrylonitrile-acrylic acid copolymer (Mw=1,050,000, acrylonitrile/acrylic acid=7.3: 2.7 (mol/mol)) was used.

Comparative Example 1

A binder film was produced in the same manner as in Example 1 except that 2.5 g of an acrylonitrile polymer (Mw=2,100,000, i.e. acrylonitrile/acrylic acid=10:0 (mol/mol)) was used.

Comparative Example 2

A binder film was produced in the same manner as in Example 1 except that 2.5 g of an acrylonitrile-acrylic acid copolymer (Mw≥500,000, acrylonitrile/acrylic acid=2.8:7.2 (mol/mol)) was used.

Comparative Example 3

A binder film was produced in the same manner as in Example 1 except that 2.5 g of an acrylonitrile-acrylic acid copolymer (Mw≥500,000, acrylonitrile/acrylic acid=1.3:8.7 (mol/mol)) was used.

Example 4

10 g of the acrylonitrile-acrylic acid copolymer solution prepared in Example 1, 9.4 g of a silicon-based active material and 0.1 g of carbon black as a conductive material were mixed together to prepare an electrode composition. NMP was added to the electrode composition until the total solids content reached 30 wt %. The resulting composition was coated to a thickness of 150 μm on a copper foil using a doctor blade, dried in a dry oven at 130° C. for 30 minutes, and rolled to a proper thickness to obtain an anode.

Example 5

An electrode was produced in the same manner as in Example 4 except that 10 g of the acrylonitrile-acrylic acid copolymer solution prepared in Example 2 was used.

Example 6

An electrode was produced in the same manner as in Example 4 except that 10 g of the acrylonitrile-acrylic acid copolymer solution prepared in Example 3 was used.

Comparative Example 4

An electrode was produced in the same manner as in Example 4 except that 10 g of the acrylonitrile polymer solution prepared in Comparative Example 1 was used.

Comparative Example 5

An electrode was produced in the same manner as in Example 4 except that 10 g of the acrylonitrile-acrylic acid copolymer solution prepared in Comparative Example 2 was used.

Comparative Example 6

An electrode was produced in the same manner as in Example 4 except that 10 g of the acrylonitrile-acrylic acid copolymer solution prepared in Comparative Example 3 was used.

Example 7

The anode plate produced in Example 4 was perforated to form a circular hole (surface area=1.49 $cm^2$), which was then used as a working electrode. A lithium cobalt oxide foil was perforated to form a circular hole (surface area=1.77 $cm^2$), which was then used as a counter electrode. The working electrode was assembled with the counter electrode to construct a coin-type full cell. A separator made of a microporous polyolefin film was interposed between the working electrode and the counter electrode. Then, LiPF6 as an electrolyte was dissolved in a mixed solvent of ethylene carbonate (EC), diethyl carbonate (DEC) and ethyl methyl carbonate (EMC) (4:3:3 (v/v/v)) to prepare a 1 M electrolyte solution. The electrolyte solution was injected into the electrode assembly to fabricate a lithium secondary battery.

Example 8

A lithium secondary battery was fabricated in the same manner as in Example 7 except that the anode produced in Example 5 was used.

Example 9

A lithium secondary battery was fabricated in the same manner as in Example 7 except that the anode produced in Example 6 was used.

Comparative Example 7

A lithium secondary battery was fabricated in the same manner as in Example 7 except that the anode produced in Comparative Example 4 was used.

Comparative Example 8

A lithium secondary battery was fabricated in the same manner as in Example 7 except that the anode produced in Comparative Example 5 was used.

Comparative Example 9

A lithium secondary battery was fabricated in the same manner as in Example 7 except that the anode produced in Comparative Example 6 was used.

Experimental Example 1

Electrolyte Solution Resistance Test

The degree of swelling of the polymer films in an electrolyte solution was measured by the following procedure. First, ethyl carbonate (EC), diethyl carbonate (DEC) and ethyl methyl carbonate (EMC) were mixed in a ratio of 4:3:3 (v/v/v) to prepare an electrolyte solution. Each of the polymer films produced in Examples 1-3 and Comparative Examples 1-3 was cut into circular samples having a diameter of 1.8 cm. The samples were weighed and immersed in 10 mL of the electrolyte solution, sealed and stored in a thermostatic bath at 25° C. After storage for seven days, the samples were taken out of the electrolyte solution, wiped with dry paper to remove the remaining electrolyte solution, and weighed. The swelling rate of the polymer film in the electrolyte solution was calculated by the following equation:

Swelling rate (%)=(the weight of the sample after immersion in the electrolyte solution−the weight of the sample before immersion in the electrolyte solution)/(the weight of the sample before immersion in the electrolyte solution)×100

The swelling rate (%) of the film was determined by measuring and averaging the swelling rates of at least four samples. The results are shown in Table 1 below. Generally, the lower the swelling rate, the better the electrolyte solution resistance.

TABLE 1

| | Binder film (Acrylonitrile/acrylic acid) | Swelling rate (%) |
|---|---|---|
| Example 1 | 9.4/0.6 | 11.83 |
| Example 2 | 8.3/1.7 | 7.22 |
| Example 3 | 7.3/2.7 | 8.95 |
| Comparative Example 1 | 10/0 | 11.89 |
| Comparative Example 2 | 2.8/7.2 | 11.26 |
| Comparative Example 3 | 1.3/8.7 | 19.54 |

Binder materials must be impregnated with a certain amount of an electrolyte solution to allow for smooth migration of lithium ions within electrodes. If binder materials are impregnated with an excessively large amount of an electrolyte solution, they begin to swell, which is a cause of poor adhesive strength.

The results in Table 1 show that the swelling rates of the binder films (Examples 1-3) produced using the acrylonitrile-acrylic acid copolymers with a high molecular weight, in which the proportions of acrylic acid units are relatively low, were decreased with increasing content of acrylic acid relative to that of acrylonitrile, indicating improved electrolyte solution resistance. In contrast, the binder film (Comparative Example 1) produced using the high-molecular weight polyacrylonitrile, showed a relatively high swelling rate due to the absence of acrylic acid. Further, the swelling rates of the binder films (Comparative Examples 2 and 3), in which the proportions of acrylic acid units are relatively high, were increased with increasing content of acrylic acid, indicating poor electrolyte solution resistance.

These results lead to the conclusion that the acrylonitrile-acrylic acid copolymers with a high molecular weight, in which the proportions of acrylic acid units are relatively low, are the most suitable as binders for lithium secondary batteries in terms of electrolyte solution resistance.

Experimental Example 2

Adhesive Strength Test

The adhesive strength between the anode compositions, which were prepared using the high-molecular weight copolymers, and the respective current collectors was measured in accordance with the following procedure. First, each of the anode plates was cut to a given size and affixed on a slide glass. Then, the current collector was peeled off from the anode plate to measure the 180° peel strength. The adhesive strength values of the electrodes produced in Examples 4-6 were comparable to those of the electrodes produced using high-molecular weight acrylonitrile polymers, which were described in the patent application filed in the name of the Applicant (Korean Patent Application No. 10-2007-0106974 A, which was filed on Oct. 24, 2007). In addition, the electrodes (Comparative Examples 5 and 6) produced using the copolymers, in which the proportions of acrylic acid units are high relative to those of acrylonitrile units, showed slightly lower adhesive strength values than the electrodes of Examples 4-6.

That is, high adhesive strength above a specific level was ensured by the use of the acrylonitrile-acrylic acid copolymers with a high molecular weight as binders, in which the proportions of acrylic acid units are low relative to those of acrylonitrile units, even in small amounts. Therefore, the batteries fabricated using the high-molecular weight binders had relatively high capacity when compared to the batteries fabricated using conventional carbon-based electrodes, which were produced using polyvinylidene fluorite or styrene-butadiene rubber as a binder (see Experimental Example 1).

Experimental Example 3

Battery Test

Charge/discharge tests were conducted on the coin-type batteries constructed in Examples 7-9 and Comparative Examples 7-9 in accordance with the following procedure. First, charge/discharge tests were conducted twice on each of the batteries at a charge/discharge current density of 0.1 C, a charge end voltage of 4.2 V (Li/Li$^+$) and a discharge end voltage of 2.5 V (Li/Li$^+$). Subsequently, charge/discharge tests were conducted forty-eight times at a charge/discharge current density of 0.5 C, a charge end voltage of 4.2 V (Li/Li$^+$) and a discharge end voltage of 2.5 V (Li/Li$^+$). The battery was charged under constant-current/constant-voltage conditions and the end current of the constant-voltage charging was set to 0.005 C. The charge/discharge efficiency of the battery after the first cycle was calculated (initial efficiency=discharge capacity/charge capacity). The capacity ratio ($40^{th}/1^{st}$) of the battery was calculated by dividing the charge capacity of the battery after the $40^{th}$ cycle by the charge capacity of the battery after the 1st cycle. The capacity ratio was defined as a capacity retention (%). The results are given in Table 2 below.

TABLE 2

| | Initial efficiency (%) | Capacity retention (%) after 40 cycles |
|---|---|---|
| Example 7 | 71.6 | 80.8 |
| Example 8 | 71.8 | 82.6 |
| Example 9 | 71.8 | 83.6 |
| Comparative Example 7 | 71.9 | 79.0 |
| Comparative Example 8 | 71.8 | 80.2 |
| Comparative Example 9 | 71.7 | 79.3 |

As can be seen from the results in Table 2, the batteries of Examples 7-9, which were fabricated using the acrylonitrile-acrylic acid copolymers with a high molecular weight as binders, showed almost constant initial efficiency, but were slightly different in terms of capacity retention depending on the content of acrylic acid units. As explained earlier, it is believed that the copolymerization of acrylonitrile with acrylic acid resulted in improved resistance of the binders to the carbonate-based electrolyte solution.

The batteries of Examples 7-9 showed excellent characteristics in terms of initial capacity, efficiency and cycle capacity retention, compared to the batteries fabricated using conventional carbon-based anodes, which were produced using polyvinylidene fluoride or styrene-butadiene rubber as a binder (see Table 2 and Experimental Example 2).

These results are thought to be because the adhesive strength of the acrylonitrile-acrylic acid binders with a high molecular weight was much higher than that of the polymeric binders used in the conventional carbon-based active materials, as already explained in Experimental Example 2.

Although the preferred embodiments of the present invention have been disclosed for illustrative purposes, those skilled in the art will appreciate that various modifications and variations are possible in light of the above teachings, without departing from the technical spirit of the invention.

The invention claimed is:

1. An anode composition for a lithium secondary battery comprising an anode active material, a binder and a conductive material wherein:
   (A) the binder is a copolymer consisting of acrylonitrile and acrylic acid having a molar ratio of acrylonitrile to acrylic acid of 1:0.205-2;
   (B) the acrylonitrile-acrylic acid copolymer has a molecular weight in the range of 1,030,000 to 5,000,000; and
   (C) the binder is present in an amount of 1 to 30% by weight, based on the total weight of the anode composition.

2. The anode composition according to claim 1, wherein the anode active material is selected from the group consisting of carbon and graphite materials, metals capable of forming alloys with lithium and compounds containing the metals, composites of a metal or metal compound and a carbon or graphite material, and lithium nitrides.

3. The anode composition according to claim 1, wherein the conductive material is graphite, carbon black, a conductive fiber, a metal powder, a conductive whisker, a conductive metal oxide, or a conductive polymer.

4. The anode composition according to claim 3, wherein the conductive material is present in an amount of 1 to 50% by weight, based on the total weight of the anode composition.

5. The anode composition according to claim 1, further comprising a filler.

6. A lithium secondary battery comprising the anode composition according to claim 1.

7. The anode composition according to claim 1, wherein the binder dissolved in an organic solvent.

* * * * *